United States Patent [19]

Sorimachi

[11] Patent Number: 4,749,848
[45] Date of Patent: Jun. 7, 1988

[54] APPARATUS FOR AND METHOD OF MEASURING DISTANCES TO OBJECTS PRESENT IN A PLURALITY OF DIRECTIONS WITH PLURAL TWO-DIMENSIONAL DETECTORS

[75] Inventor: Kanehiro Sorimachi, Yokohama, Japan

[73] Assignee: Canon Kabushiki Kaisha, Tokyo, Japan

[21] Appl. No.: 827,016

[22] Filed: Feb. 7, 1986

[30] Foreign Application Priority Data

Feb. 9, 1985 [JP] Japan ................................. 60-22798

[51] Int. Cl.⁴ .............................................. G01J 1/20
[52] U.S. Cl. ...................................... 250/201; 250/204
[58] Field of Search ............... 250/201, 204, 578, 558; 356/1, 4; 354/402, 408; 382/1; 358/88, 107

[56] References Cited

U.S. PATENT DOCUMENTS

| | | | |
|---|---|---|---|
| 4,410,804 | 10/1983 | Stauffer | 356/4 |
| 4,529,316 | 7/1985 | DiMatteo | 356/1 |
| 4,573,191 | 2/1986 | Kidode et al. | 356/12 |
| 4,601,053 | 7/1986 | Grumet | 250/558 |

*Primary Examiner*—David C. Nelms
*Attorney, Agent, or Firm*—Fitzpatrick, Cella, Harper & Scinto

[57] ABSTRACT

This specification discloses a distance measuring apparatus and method in which two-dimensionally arranged light-receiving elements are used as illumination distribution measuring means, the correlation between the illumination distributions of the images of an object on the set of certain portions of the respective measuring means is taken to thereby calculate the distance to the object present in a certain direction corresponding to the set, and the calculations are effected with respect to a plurality of sets portions of the respective measuring means to thereby calculate the distances to objects present in a plurality of directions.

16 Claims, 5 Drawing Sheets

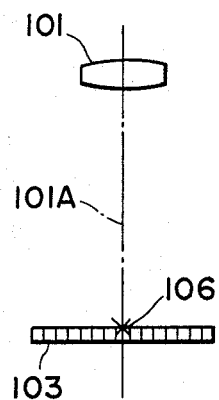 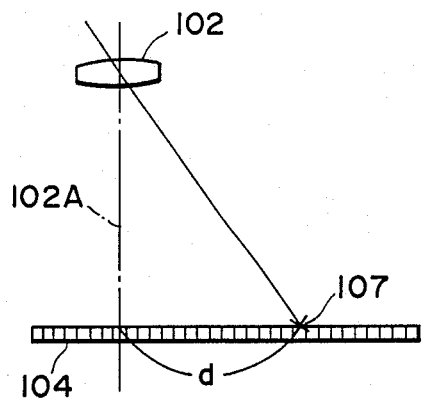
FIG. 2A  FIG. 2B
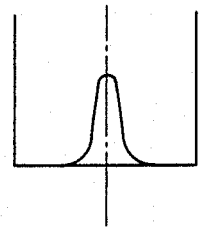 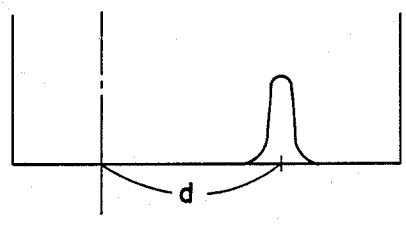
FIG. 2C  FIG. 2D
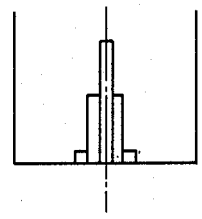 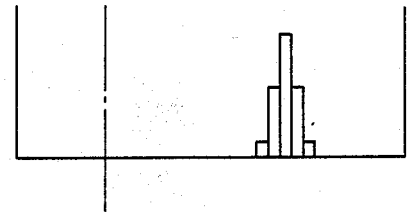
FIG. 2E  FIG. 2F

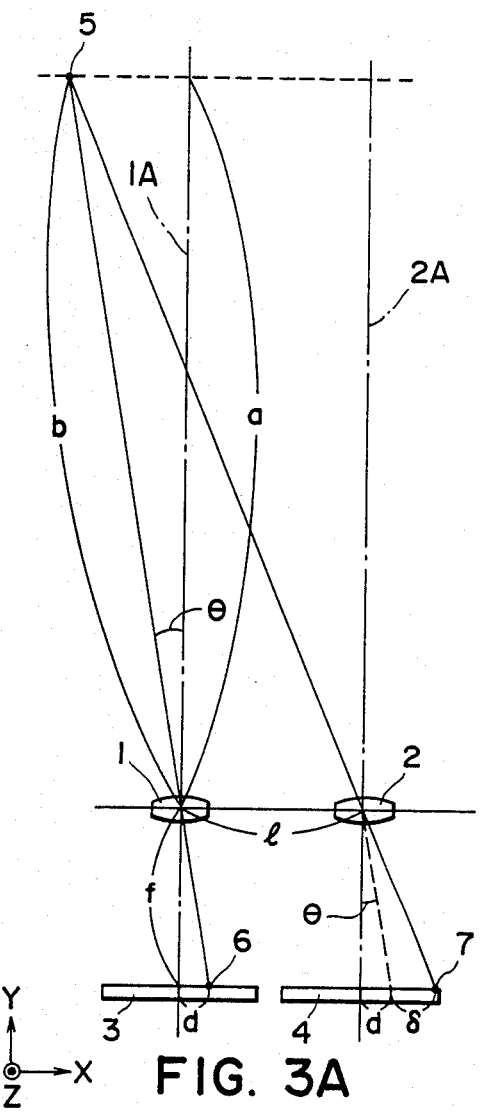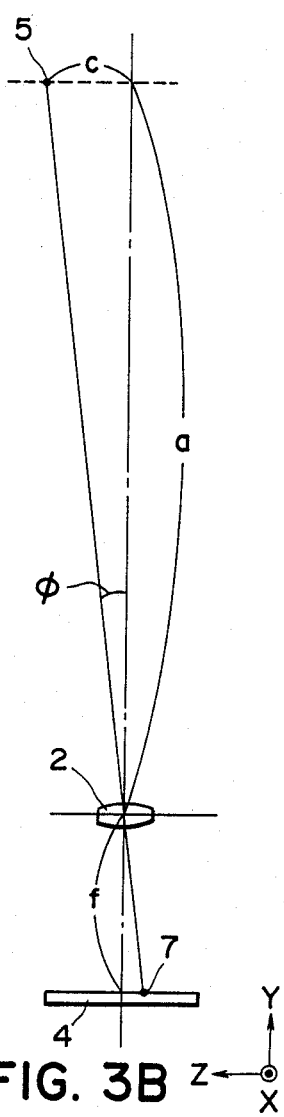
FIG. 3A     FIG. 3B
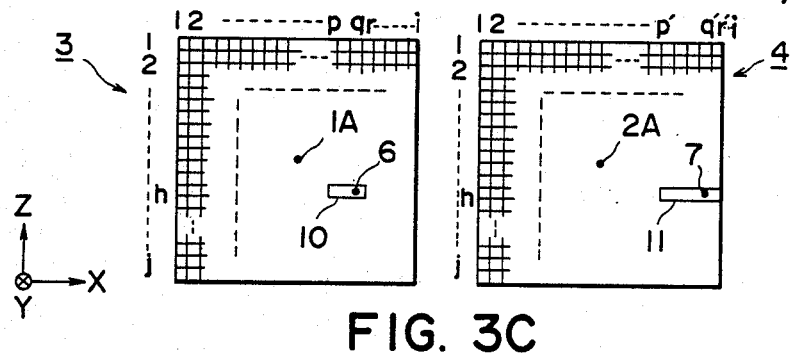
FIG. 3C

APPARATUS FOR AND METHOD OF MEASURING DISTANCES TO OBJECTS PRESENT IN A PLURALITY OF DIRECTIONS WITH PLURAL TWO-DIMENSIONAL DETECTORS

BACKGROUND AND SUMMARY OF THE INVENTION

This invention relates to a distance measuring apparatus and method, and in particular to an apparatus for and a method of optically measuring distances to objects present in multiple directions.

Measurement of the distance from the measuring apparatus to an object which is an object to be measured is utilized for various purposes.

For example, in a self-running robot, the distance measurement as described above is sometimes effected for the recognition of the ambient environment. On the basis of the information thus obtained, the robot can run while avoiding a collision with the object.

Further, as an apparatus utilizing the distance measurement as described above, there is an automobile collision preventing apparatus. In this apparatus, on the basis of the information obtained by the distance measurement, a warning is given to the driver or the directions for stopping or decelerating the automobile are given to the driver when the automobile has come close to another automobile or an object, such as a wall, beyond a predetermined distance.

For the distance measurement as described above, use is sometimes made of the method of emitting an ultrasonic wave to an object to be measured and analyzing the ultrasonic wave reflected by the object to be measured. However, the method using an ultrasonic wave encounters a problem that where the object to be measured is small, measurement becomes difficult and further, the resolving power of measurement is low.

On the other hand, there would occur to mind to optically effect the distance measurement as described above, and a method therefor is a stereo method. The outline of the stereo method will hereinafter be described.

FIGS. 1A and 1B illustrate the principle of the stereo method. In FIGS. 1A and 1B, reference numerals 101 and 102 designate lenses of equal focal lengths, and reference characters 101A and 102A denote the optic axes thereof. The lenses 101 and 102 are disposed so that the optic axes 101A and 102A thereof are parallel to each other and a line (base line) passing through the centers of the lenses is orthogonal to the optic axes 101A and 102A. Rearwardly of the lens 101, measuring means 103 is disposed at a position spaced apart by the focal length f of the lens 101, and rearwardly of the lens 102, measuring means 104 is disposed at a position spaced apart by the focal length f of the lens 102. These measuring means 103 and 104 are disposed on a straight line in a direction parallel to the direction of the base line.

In FIG. 1A, an object 105 which is an object to be measured is present at infinity along the optic axes 101A and 102A. In this case, the image 106 of the object 105 on the measuring means 3 by the lens 101 is present on the optic axis 101A, and likewise, the image 107 of the object 105 on the measuring means 104 by the lens 102 is present on the optic axis 102A.

In FIG. 1B, the object 105 is present at a position spaced apart by a finite distance Q on the optic axis 101A. In this case, the image 106 of the object 105 on the measuring means 103 by the lens 101 is present on the optic axis 101A, but the image 107 of the object 105 on the measuring means 104 by the lens 102 is present at a position spaced apart from the optic axis 102A.

Accordingly, by detecting the amount of deviation d of the image 107 from the optic axis 102A (corresponding to the position of the image 106 on the measuring means) by measuring means, the distance Q to be measured can be found by the following equation from the focal length f and the base length l between the lens 101, 102 and the measuring means 103,104:

$$Q = \frac{fl}{d}.$$

This equation is established not only when the object is present on the optic axis, but also generally.

In this case, d is the difference between the amounts of deviation of two images on the measuring means 103 and 104 from the respective optic axes.

Meanwhile, an object to be measured generally has a certain extension and therefore, such an image that has the extension is formed on the measuring means. Accordingly, it is difficult to identify the image of a certain point on an object.

In the stereo method as described above, the correlation between the illumination distribution on one measuring means 103 and the illumination distribution on the other measuring means 104 is taken to find said d from the information about the positions of the images 106 and 107 by the measuring means 103 and 104.

FIGS. 2A-2F illustrate the principle of such a correlation method.

As the measuring means 103 and 104, use is made, for example, of CCD arrays which are self-scanning type sensors. As is well known, the CCD array is comprised of a number of light-receiving elements of minute segments each having a width of the order of 10μ, and can put out electrical signals corresponding to the illuminations of the image detected by the light-receiving elements as time-serial signals in accordance with a predetermined order.

In FIG. 2A, the CCD array 103 which is the measuring means corresponding to the lens 101 has n number of light-receiving elements, and in FIG. 2B, the CCD array 104 which is the measuring means corresponding to the lens 102 has m number of light-receiving elements (m>n). That is, if the distance to the object on the optic axis 101A is to be measured, the image 106 by the lens 101 is present on the optic axis 101A independently of the distance to the object, but the image 107 by the lens 102 changes its position in conformity with the distance to the object and therefore, a greater number of light-receiving elements are provided on the CCD array 104 than on the CCD array 103. In such an arrangement, the CCD array 103 is called a standard view field and the CCD array 104 is called a reference view field.

The illumination distributions in the standard view field and the reference view field in the arrangement as shown in FIGS. 2A and 2B are such as shown in FIGS. 2C and 2D. That is, the imaging relation in the direction of the optic axis between the object 105 and the image 106 with respect to the lens 101 is equal to the imaging relation in the direction of the optic axis between the object 105 and the image 107 with respect to the lens 102 (that is, the magnifications are equal) and therefore, the illumination distribution of the image 106 and the illumination distribution of the image 107 differ from each other only in that the image 107 deviates from the optic axis by the distance d.

Accordingly, from the CCD arrays 103 and 104, there are time-serially obtained the outputs corresponding to the light-receiving elements as shown in FIGS. 2E and 2F.

So, in order to take the correlation between the outputs of the two CCD arrays, the sum $$COR_1 = \sum_{k=1}^{n} (S_k \sim R_k)$$

of the differences between the corresponding outputs of the outputs $S_1 \sim S_1$ of the first to nth light-receiving elements in the standard view field and the outputs $R_1 \sim R_n$ of the first to nth light-receiving elements in the reference view field is first found. Subsequently, in the same manner, the sum $$COR_2 = \sum_{k=1}^{n} (S_k \sim R_{k+1})$$

of the differences between the corresponding outputs of the outputs $S_1 \sim S_n$ of the first to nth light-receiving elements in the standard view field and the outputs $R_2 \sim R_{n+1}$ of the second to (n+1)th light-receiving elements in the reference view field is found. Thereafter, in the same manner, up to $$COR_{m-n+1} = \sum_{k=1}^{n} (S_k \sim R_{k+m-1})$$

is found.

The number of COR which is the smallest value (ideally 0) of the thus found (m−n+1) values is chosen, and that number is multiplied by the width of the light-receiving element of the CCD array, whereby the value of said d can be found.

Where the distance measurement using the correlation method as described above is utilized in the distance measurement not only in a single direction but also in multiple directions having two-dimensionally a certain expanse, effecting the distance measurement as described above in each direction while mechanically rotating the entire measuring apparatus can be exemplarily shown as a method.

However, this method would suffer from a problem that it requires a mechanical driving mechanism and the driving thereof takes much time and measurement cannot be accomplished within a short time. Further, in this method, it would necessary to record both of the signal from the measuring means and the direction signal from the mechanical driving means during the recording of a two-dimensional distance pattern, and thus, signal processing would become complicated.

It is an object of the present invention to solve the above-noted problems and to provide an apparatus for and a method of measuring distances to objects present in multiple directions which are simple in signal processing and good in accuracy.

According to the present invention, to solve the above-noted problems peculiar to the prior art or the example of the conception, there are provided a distance measuring apparatus and method characterized in that two-dimensionally arranged light-receiving elements are used as illumination distribution measuring means, the correlation between the illumination distributions of the images of an object formed by the lenses in the set of certain portions of the respective measuring means is taken to thereby calculate the distance to an object present in a certain direction corresponding to said set, and said calculations are effected with respect to a plurality of set portions of the respective measuring means to thereby calculate the distances to objects present in a plurality of directions.

BRIEF DESCRIPTION OF THE DRAWINGS

FIGS. 1A and 1B and FIGS. 2A, 2B, 2C, 2D, 2E, and 2F illustrate the principle of the distance measurement using the stereo method.

FIGS. 3A, 3B and 3C show an embodiment of the present invention.

DESCRIPTION OF THE PREFERRED EMBODIMENTS

Figures 1A, 1B:
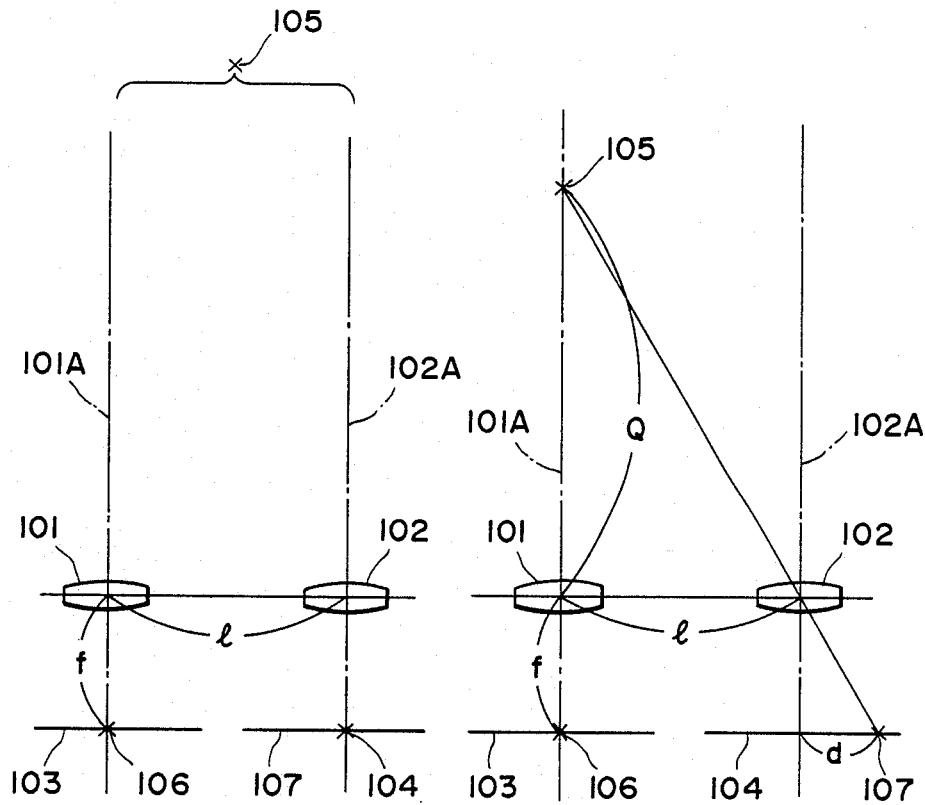

A specific embodiment of the distance measuring apparatus and method of the present invention will hereinafter be described with reference to the drawings.

FIGS. 3A–3C illustrate an embodiment of the present invention, FIG. 3A being a plan view, FIG. 3B being a side view, and FIG. 3C being a front view. In FIGS. 3A–3C, reference numerals 1 and 2 designate lenses of equal focal lengths, and reference characters 1A and 2A denote the optic axes of these lenses. The lenses 1 and 2 are disposed so that the optic axes 1A and 2A thereof are parallel to each other and the base line is orthogonal to the optic axes 1A and 2A. The distance between the optic axes 1A and 2A, namely the base length, is l. Reference numerals 3 and 4 designate two-dimensional illumination distribution measuring means such as CCD two-dimensional sensors corresponding to the lenses 1 and 2, respectively. The sensors 3 and 4 are spaced apart from the lenses 1 and 2 by the focal length f of the lenses 1 and 2 and are disposed so as to be perpendicular to the optic axes 1A and 2A.

As shown in FIG. 3C, the two sensors 3 and 4 have the same arrangement of light-receiving elements, that is, they have two-dimensional arrangement of i number of light-receiving elements in X-direction and j number of light-receiving elements in Z-direction. Also, the disposition relation of the sensor 3 relative to the optic axis 1A and the disposition relation of the sensor 4 relative to the optic axis 2A are identical to each other.

In FIGS. 3A and 3B, reference numeral 5 designates an object which is an object to be measured. As shown, the object 5 is present in the direction of an angle $\theta$ in X-direction and the direction of an angle $\phi$ in Z direction, with respect to the optic axis 1A, as viewed from the center of the lens 1. The images of the object 5 formed on the sensors 3 and 4 by the lenses 1 and 2 are denoted by 6 and 7, respectively.

As shown in FIG. 3C, of the light-receiving elements of the sensor 3, the p-rth light-receiving element in X-direction in the hth line in Z-direction, including the qth light-receiving element in X-direction in the hth line in Z-direction on which the image 6 lies, is selected as a standard view field 10. Likewise, of the light-receiving elements of the sensor 4, the p'—r'th light-receiving element in X-direction in the h th line in Z-direction, including the q'th light-receiving element in X-direction in the hth line in Z-direction on which the image 7 is to lie, is selected as a reference view field 11. Here, $(r-p)<(r'-p')$, that is, the number of light-receiving elements belonging to the reference view field is greater than the number of light-receiving elements belonging to the standard view field.

Thus, the distance to the object 5 (i.e., the distance from the center of the lens 1 to the object 5) can be calculated from the output signals of the light-receiving elements in the standard view field 10 and the reference view field 11 selected correspondingly to the directions, in the following manner.

First, as in the above-described stereo method, the correlation between the illumination distributions in the standard view field 10 and the reference view field 11 is taken, whereby $\delta$, i.e., the difference between the amounts of relative positional deviations of the images 6 and 7 on the two sensors 3 and 4 from the respective optic axes 1A and 2A, is found. Subsequently, from the relation that $$\delta/f = l/a,$$
$$a = \frac{fl}{\delta}$$

is found. Then $b = a \sec \phi$ is found and $c = a \tan \phi$ is found. Thus, the distance $Q(=\sqrt{b^2+c^2})$ to the object 5 is calculated as $$R = a\sqrt{\sec^2 74 + \tan^2 \phi}.$$

By effecting the above-described distance calculation with respect to sets of suitable numerical values of $\theta$ and $\phi$, the distances in multiple directions can be measured. Of course, the set of the standard view field and the reference view field 11 of the sensors 3 and 4 is suitably selected in conformity with the set of $\theta$ and $\phi$.

Actually, the light-receiving surface of the sensor 3 is divided into several blocks corresponding to directions, a standard view field is set for each of the blocks and the distance measurement is effected with respect to all the blocks, whereby said sets of $\theta$ and $\phi$ are varied and the distances in multiple directions are measured. In each block of the sensor 3, at least some of the light-receiving elements included in the block are selected as the standard view fields. Correspondingly to each of these standard view fields, suitable light-receiving elements of the sensor 4 are selected as the reference view fields.

Figure 4A:
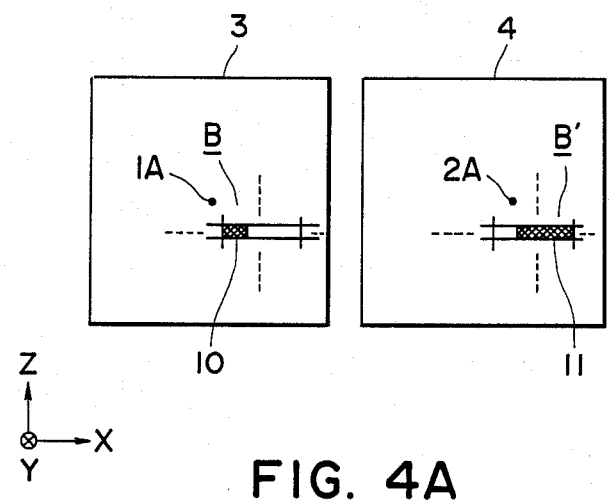
FIGS. 4A and 4B and FIGS. 5A and 5B are front views of sensors.

FIG. 4A illustrates another embodiment of the present invention and is a front view similar to FIG. 3C and particularly showing the disposition of sensors relative to the optic axes of lenses. The light-receiving elements of the sensors 3 and 4 are respectively divided into a number of blocks in a similar pattern. Each of these blocks forms a line-like shape in X-direction. The leftward light-receiving element row 10 of the light-receiving elements belonging to the block B of the sensor 3 is selected as the standard view field in this block which corresponds to a certain direction. The length of the standard view field 10 in X-direction is $X_0$. The light-receiving element row 11 excepting the light-receiving element row corresponding to the length $X_0$ of said standard view field 10, from the left of the light-receiving elements belonging to the block B' of the sensor 4 lying at a position corresponding to the block B of the sensor 3, is selected as the reference view field of a complementary shape. This also holds true of the other sets of blocks of the sensors 3 and 4.

Figure 4B:
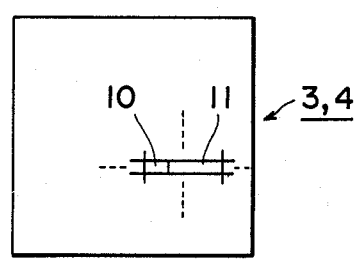

FIG. 4B shows the sensors 3 and 4 superposed one upon the other. In each block, the standard view field 10 of the sensor 3 and the reference view field 11 of the sensor 4 form a continuous line-like shape without overlapping each other.

In the present embodiment, the positions of the sensors 3 and 4 relative to the optic axes 1A and 2A of the two lenses differ from each other. That is, the sensors are disposed so that the relative positional relation between the optic axis 2A and the sensor 4, when the sensor 4 is parallel-moved rightwardly in X-direction by the length $X_0$ of the standard view field 10, is the same as the relative positional relation between the optic axis 1a and the sensor 3. Thus, measurement of the distances up to infinity is made possible since the images of the infinite object existing in the associated direction both fall within both fields 10 and 11.

Figure 6:
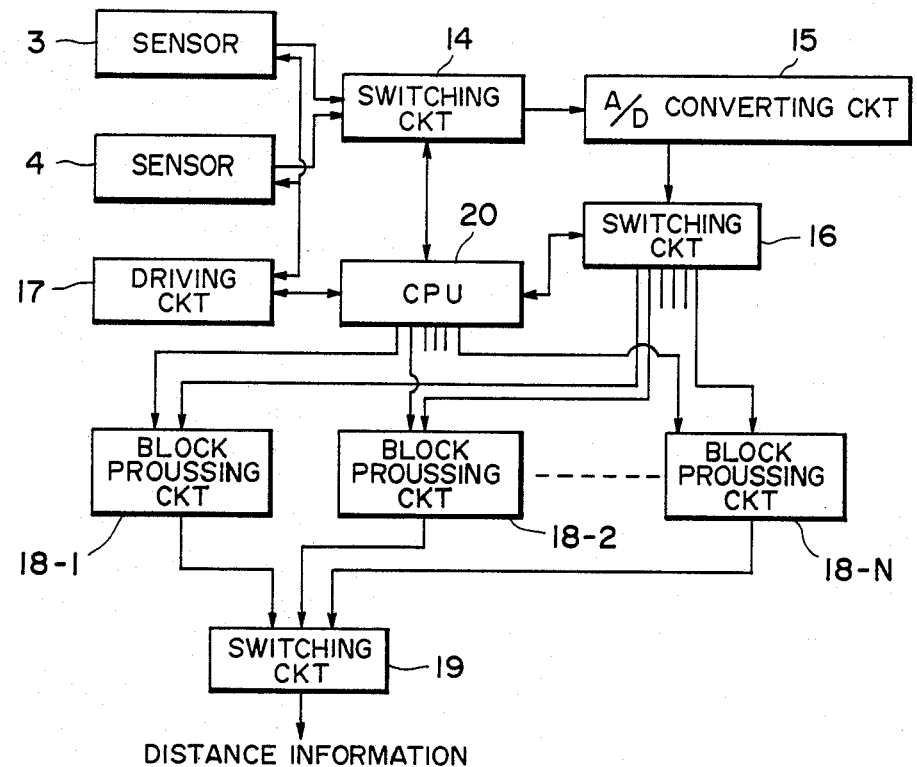
FIG. 6 is a block diagram of the signal processing in the embodiment of the present invention.

FIG. 6 is a block diagram of the present embodiment.

The two sensors 3 and 4 are driven in synchronism with each other by a driving circuit 17, and illumination signals are time-serially put out from the light-receiving elements of the sensors. The outputs of the sensors 3 and 4 are alternately selected by a switching circuit 14, are combined and put out as a time-serial signal. In this time-serial signal, a continuous form is assumed in the order of the signal from a light-receiving element row selected as the standard view field in the first block of the sensor 3, the signal from a light-receiving element row selected as the reference view field in the first block of the sensor 4, the signal from a light-receiving element row selected as the standard view field in the second block of the sensor 3, the signal from a light-receiving element row selected as the reference view field in the second block of the sensor 4, and so on. It is seen from FIG. 4B that such a time-serial signal can be easily obtained by selecting one of the outputs from the sensors 3 and 4 at a suitable time in the switching circuit 14.

The output of the switching circuit 14 is input to an A/D converting circuit 15, in which the analog signal is converted into a 2-bit or 8-bit digital signal. Thus, the digital signal put out from the A/D converting circuit 15 is input to a switching circuit 16. In this switching circuit 16, the output from the A/D converting circuit 15 is distributed for each set of the standard view field signal and the reference view field signal from the corresponding blocks and is input to block processing circuits 18-1, 18-2, ..., 18-N. That is, only the set of the standard view field signal and the reference view field signal from the set of the first blocks in the sensors 3 and 4 is input to the block processing circuit 18-1, only the set of the standard view field signal and the reference view field signal from the set of the second blocks in the sensors 3 and 4 is input to the block processing circuit 18-2, and in a similar manner, signals concerning the sets of succeeding blocks in the sensors are input to the subsequent block processing circuits. In each block processing circuit, the distance to the objects in each direction is calculated on the basis of the correlation method in accordance with the procedure as described above.

The outputs from the block processing circuits 18-1, 18-2, ..., 18-N are input to a switching circuit 19, in which they are combined and put out as a time-serial signal.

In FIG. 6, the driving circuit 17, the switching circuits 14, 16, and the block processing circuits 18-1, 18-2, ..., 18-N are controlled by CPU 20. That is, CPU 20 controls and detects the signal of the driving circuit 17, controls the switching circuits 14 and 16 on the basis of the standard view field position selected in the sensor 3 and the reference view field position selected in the sensor 4, and imparts the direction information ($\theta$, $\phi$) of each set of blocks to the block processing circuits 18-1, 18-2, ..., 18-N.

Figure 7:
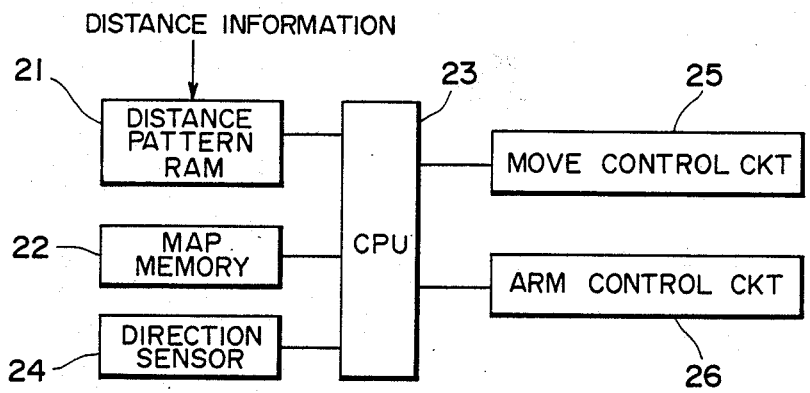
FIG. 7 is a block diagram of a self-running robot according to the present invention.

FIG. 7 is a block diagram of a robot which operates on the basis of the distance information obtained by the present embodiment.

This robot contains therein the distance measuring apparatus shown in FIG. 6, and the information from the switching circuit 19 thereof is recorded as a multi-direction distance pattern in RAM 21. The past distance pattern or a map for command is stored in a map memory 22, and the distance pattern on the map memory 22 is compared with the current distance pattern by CPU 23, and further, the information from a direction sensor 24 and the information from the sensor of such as the direction, speed and distance of movement or the operation processing unit are also introduced, whereby a movement control circuit 25 and an arm control circuit 26 are operated.

According to the present embodiment, the processing circuit is simplified and further, multidirection distance measurement can be accomplished within a short time without requiring an image memory.

Figures 5A, 5B:
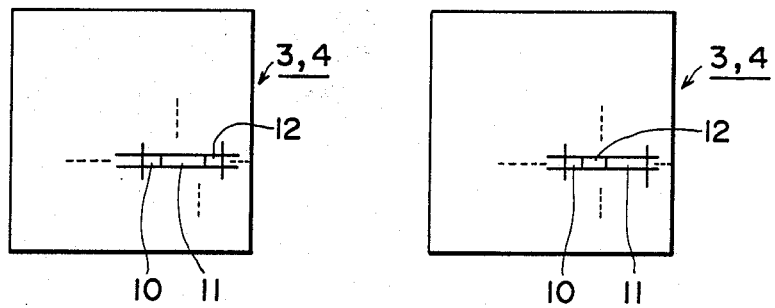

In the present embodiment, in the state in which the two sensors 3 and 4 are superposed one upon the other as shown in FIG. 4B, the entire concerned block is covered by the standard view field 10 and the reference view field 11 of each block, but depending on the distance range to be measured, the entire block need not be covered. FIGS. 5A and 5B are views similar to FIG. 4B and showing such a specific example. That is, in these Figures, the light-receiving element row 10 selected as the standard view field in the sensor 3, the light-receiving element row 11 selected as the reference view field of a non-complementary shape in the sensor 4 and the light-receiving element row 12 selected as neither of the standard view field and the reference view field are present in the same block of the two sensors. In such case, the cutting of the signal may be suitably effected in the switching circuit 14 in the apparatus of FIG. 6.

In the above-described embodiments, a case where no image memory is required has been shown, but depending on the distance range to be measured, an image memory may be provided and setting may be effected so that the standard view field and the reference view field may overlap each other in the same block or different blocks on the sensor may overlap each other, and calculation of the distance may be accomplished which reference is made to the information in the image memory as required.

This is because the size of the field may be made large and the field may be varied in the block.

In such case, a delay circuit may be interposed between the sensor 4 and the switching circuit 14 of FIG. 6, whereby the image memory may be omitted.

According to the distance measuring apparatus and method of the present invention as described above, multi-direction distance measurement can be accomplished accurately within a short time without the use of mechanical means. Also, according to the present invention, the direction and range of distance measurement can be relatively freely chosen by suitably setting the position and size of the set of portions of two illumination distribution measuring means, and the determination of the direction and range of measurement is flexible.

I claim:

1. An apparatus for measuring the distances to objects present in a plurality of directions, comprising:
    a pair of optical systems, said pair of optical systems being disposed so that the optic axes thereof are parallel to each other at a predetermined distance;
    a pair of illumination distribution measuring means respectively disposed behind said pair of optical systems, said pair of measuring means being disposed perpendicularly to the optic axes, respectively, of said pair of optical systems, each of said pair of measuring means including a plurality of two-dimensionally arranged light-receiving elements, said plurality of light-receiving elements of said pair of measuring means being separable into a plurality of sets of portions each comprising a plurality of light-receiving elements of each said measuring means, correspondingly to a direction relative to the position in an object space at which the object to be measured lies; and
    means for calculating the distances to the objects to be measured present in a plurality of directions corresponding to said plurality of sets of portions by taking the correlation between the illumination distributions of the images of each object to be measured in at least parts of each said set of portions.

2. An apparatus according to claim 1, wherein said calculating means finds the difference between the amounts of deviation of two images from said optic axes of taking said correlation and calculates the distance to the object to be measured on the basis thereof.

3. An apparatus according to claim 1, wherein said correlation is taken with respect to the illumination distributions of the images on the parts of said set of portions.

4. An apparatus according to claim 1, wherein said calculating means has a plurality of parallel-disposed signal processing means, the output signals of said set of portions are input as a set to each of said signal processing means and the distances to be measured present in the plurality of directions are calculated in parallel.

5. An apparatus according to claim 1, wherein said pair of optical systems have the same focal length.

6. An apparatus according to claim 5, wherein said pair of illumination distribution measuring means are disposed at the same distance of said focal length behind said pair of optical systems.

7. An apparatus according to claim 1, wherein one of the two directions of arrangement of said light-receiving elements are parallel to a plane containing the optic axes of said pair of optical systems.

8. An apparatus according to claim 1, wherein said pair of illumination distribution measuring means have substantially identical light-receiving element arrangements.

9. An apparatus according to claim 8, wherein the dispositions of said pair of illumination distribution measuring means relative to the optic axes of said optical systems deviate from each other in a direction parallel to a plane containing said pair of optic axes.

10. An apparatus according to claim 7, wherein said set of portions each comprise a light-receiving element row extending in said one direction of arrangement.

11. An apparatus according to claim 8, wherein said set of portions each comprise the same part of the light-receiving element arrangement, and said correlation is taken with respect to the illumination distributions of the images on the mutually complementary parts of said set of portions.

12. An apparatus according to claim 8, wherein said set of portions each comprise the same part of the light-receiving element arrangement, and said correlation is taken with respect to the illumination distributions of the images on the non-complementary parts of said set of portions.

13. An distance measuring method comprising disposing two optical systems at a predetermined distance from each other so that the optic axes thereof are parallel to each other, disposing a pair of illumination distribution measuring means behind said optical systems perpendicularly to said optic axes, using two-dimensionally arranged light-receiving elements as the measuring means, taking the correlation between the illumination distributions of the images of an object to be measured, formed by said optical systems, on at least parts of a set of portions in the pair of said measuring means, thereby calculating the distance to the object to be measured present in a direction corresponding to said set of portions, and effecting said calculation with respect to the plural sets of portions of said measuring means, thereby calculating the distances to objects present in a plurality of directions corresponding to said plural sets of portions.

14. A method according to claim 13, wherein said two optical systems have the same focal length.

15. A method according to claim 14, wherein said pair of illumination distribution measuring means are disposed at the same distance of said focal length behind said pair of optical systems.

16. A method according to claim 13, wherein one of the two directions of arrangement of said light-receiving elements are parallel to a plane containing the optic axes of said pair of optical systems.

* * * * *

UNITED STATES PATENT AND TRADEMARK OFFICE
CERTIFICATE OF CORRECTION

PATENT NO. : 4,749,848

DATED : June 7, 1988

INVENTOR(S) : KANEHIRO SORIMACHI

Page 1 of 2

It is certified that error appears in the above-identified patent and that said Letters Patent is hereby corrected as shown below:

IN [57] THE ABSTRACT

Line 10, "sets portions" should read --set portions--.

SHEET 5, Figure 6

Nos. 18-1, 18-2, 18-N, three occurrences, "BLOCK PROUSSING CKT" should read --BLOCK PROCESSING CKT--.

COLUMN 1

Line 62, "measuring means 3" should read --measuring means 103--.

COLUMN 3

Line 15, "$S_1 \sim S_1$" should read --$S_1 \sim S_n$--.
Line 53, "would necessary" should read --would be necessary--.

COLUMN 5

Line 28, "b=a sec $\phi$" should read --b=a sec $\theta$--.

Line 32, "$R = a\sqrt{sec^2 74 + tan^2 \phi}.$" should read --$R = a\sqrt{sec^2 \theta + tan^2 \phi}.$--.

Line 37, "field and" should read --field 10 and--.

UNITED STATES PATENT AND TRADEMARK OFFICE
CERTIFICATE OF CORRECTION

PATENT NO. : 4,749,848
DATED : June 7, 1988
INVENTOR(S) : KANEHIRO SORIMACHI

It is certified that error appears in the above-identified patent and that said Letters Patent is hereby corrected as shown below:

COLUMN 6

Line 16, "optic axis 1a" should read --optic axis 1A--.

COLUMN 7

Line 23, "or" should read --of--.

COLUMN 9

Line 16, "An" should read --A--.

Signed and Sealed this

Thirty-first Day of October, 1989

Attest:

DONALD J. QUIGG

*Attesting Officer*     *Commissioner of Patents and Trademarks*